Figure 1:
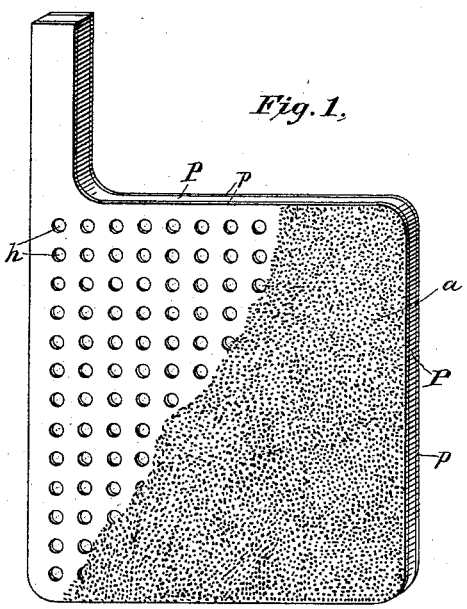

(No Model.)

J. S. SELLON.
SECONDARY BATTERY.

No. 396,769. Patented Jan. 29, 1889.

Witnesses.

Inventor.

UNITED STATES PATENT OFFICE.

JOHN S. SELLON, OF HATTON GARDEN, COUNTY OF MIDDLESEX, ENGLAND, ASSIGNOR TO THE ELECTRICAL ACCUMULATOR COMPANY, OF NEW YORK.

SECONDARY BATTERY.

SPECIFICATION forming part of Letters Patent No. 396,769, dated January 29, 1889.

Application filed April 26, 1887. Serial No. 236,209. (No model.) Patented in England December 23, 1881, No. 5,631; in Argentine Republic November 21, 1882, No. 354; in British Guiana December 11, 1882, No. 197/3,155; in Mexico January 27, 1883; in Canada March 15, 1883, No. 16,499; in Chili June 8, 1883, and in Brazil June 16, 1883, No. 53.

*To all whom it may concern:*

Be it known that I, JOHN SCUDAMORE SELLON, a subject of the Queen of Great Britain and Ireland, residing at Hatton Garden, in the county of Middlesex, England, have invented certain new and useful Improvements in Secondary Batteries, (for which I have obtained a patent in Great Britain, No. 5,631, December 23, 1881; Argentine Republic, No. 354, November 21, 1882; British Guiana, No. 197/3,155, December 11, 1882; Mexico, January 27, 1883; Canada, No. 16,499, March 15, 1883; Chili, June 8, 1883, and Brazil, No. 53, June 16, 1883,) of which the following is a specification.

My invention pertains to secondary batteries or electrical accumulators, and more particularly relates to the construction of the plates, supports, retainers, or frames upon, in, or against which the active material or agent is deposited, placed, or fixed.

The object sought is to provide a support that is inoxidizable while possessing extreme lightness. Platinum or gold are among the most desirable metals available for this purpose, but they are expensive, and when used in plates of sufficient quantity or thickness to give the necessary mechanical strength prohibitively so. To secure the advantages of their use while avoiding this expense, I use very thin plates or small quantities of such metals, stiffening them by a backing or support of an inoxidizable material. I use for this purpose carbon either in a solid form or compressed or mixed with other substances, or asbestos, wood, papier-maché, cellulose, either alone or in combination with metals not easily oxidized—such, for example, as platinum. In form these may be of a cellular, perforated, corrugated, grooved, fluted, roughened, indented, tubular, or woven shape, or any combination of these forms, or of any other shape capable of retaining the active material or agent in a finely-divided, pasty, deposited, compressed, or other condition. I may make the plates, supports, retainers, or frames of a compound form—say, for example, two outer non-metallic plates constructed in the manner hereinbefore described, with an intervening plate, film, or coating of metal—such, for example, as platinum—such combination forming a terminal; or I may cover, either mechanically or by means of electro deposition or otherwise, either the single or compound plates with a layer or film of metallic matter—such, for example, as platinum.

The accompanying drawings illustrate some of the described forms.

Figure 3:
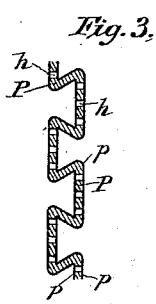
Figure 2:
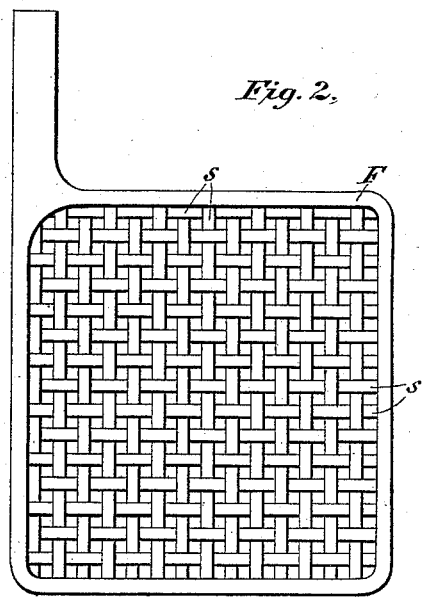
Figure 4:
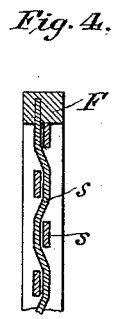

Figure 1 shows a perforated plate, to which is applied thin sheets of platinum. Fig. 2 shows a support formed of woven or intertwined strips of inoxidizable material combined with strips of platinum. Fig. 3 is a cellular perforated plate, to which the platinum is best applied by electro-deposition. Fig. 4 is a cross-section of Fig. 2.

In Fig. 1, P is a plate or terminal having perforations $h$. It consists of an inoxidizable material, as described—carbon, wood, papier-maché, celluloid—serving as a backing or stiffening, upon which the sheets of an inoxidizable metal, as platinum, $p$, is fixed. To the surface and within the perforations an active material, $a$, as a lead oxide, is applied.

In Fig. 2 the support or terminal consists of strips $s$ of an inoxidizable material, as described—wood, carbon, papier-maché, celluloid—combined with which and supported thereby are strips of an inoxidizable metal, as platinum. The combination may consist of a strip of the described material and a strip of platinum woven together, or a strip of the described material to the surface or surfaces of which a thin strip of platinum is fixed, and two of such compound strips may be woven or intertwined to form a support or terminal. A series of these woven strips are placed in a frame, F, and the active material, as a lead oxide, applied to the support so formed.

In Fig. 3 there is shown a cellular perforated plate or support consisting of the described inoxidizable material, P, having holes or perforations $h$, to the surface of which is applied an inoxidizable metal, as $p$, in this case preferably applied by electro-deposition.

In all these forms there is an inoxidizable material combined with an inoxidizable metal—sheet or foil—an equivalent for which is an electroplated film or coating. The plates or supports coated, combined, or filled with an active material are grouped in containing-cells of insulating material containing an electrolytic liquid, as is the well-known practice.

What I claim, and desire to secure by Letters Patent, is—

1. In a secondary battery, a plate or support containing inoxidizable material supporting a sheet, plate, or conductor of practically-inoxidizable metal and combined with an active-material or material to be rendered active mechanically applied thereto, substantially as described.

2. In a secondary battery, a plate or support containing a practically-inoxidizable material combined with a practically-inoxidizable conductor supported thereby and an active material or material to be rendered active, substantially as described.

3. In a secondary battery, a support or strip containing a non-conducting material combined with a practically-inoxidizable conductor and an active material, all in substantially continuous mechanical contact, as set forth.

4. In a battery, a support or terminal containing a practically-inoxidizable material, combined with a conductor of platinum and a mechanically-applied active material, substantially as described.

5. In a battery, a plate or support containing a practically-inoxidizable material and a practically-inoxidizable metal having a woven shape, combined with a mechanically-applied active material, substantially as described.

In testimony whereof I have signed my name to this specification in the presence of two subscribing witnesses.

JOHN S. SELLON.

Witnesses:
W. J. WEEKS,
C. F. WATERMAN,
*Both of 9 Berchin Lane, London.*